(12) United States Patent
Bozonnet

(10) Patent No.: US 6,314,840 B2
(45) Date of Patent: Nov. 13, 2001

(54) SEPARABLE COUPLING AND CORRESPONDING TOOL

(75) Inventor: Daniel Bozonnet, Fourquemin (FR)

(73) Assignee: Facom, Cedex (FR)

( * ) Notice: Subject to any disclaimer, the term of this patent is extended or adjusted under 35 U.S.C. 154(b) by 0 days.

(21) Appl. No.: 09/851,334

(22) Filed: May 9, 2001

Related U.S. Application Data (6362) Continuation of application No. 08/894,063, filed as application No. PCT/FR96/00206 on Feb. 7, 1997.

(30) Foreign Application Priority Data

Feb. 14, 1995 (FR) .................................................. 95 01675

(51) Int. Cl.$^7$ .............................. B25B 15/00; B25B 23/00
(52) U.S. Cl. .............................. 81/121.1; 81/460; 81/436
(58) Field of Search .............................. 81/436, 450, 460, 81/461, 176.1–176.2, 121.1, 177.85

(56) References Cited

U.S. PATENT DOCUMENTS

| | | |
|---|---|---|
| 4,361,412 | 11/1982 | Stolarczyk . |
| 4,625,599 | 12/1986 | Icard . |
| 4,842,467 | 6/1989 | Armstrong . |
| 4,930,378 | 6/1990 | Colvin . |
| 5,291,811 | 3/1994 | Goss . |
| 5,347,892 | 9/1994 | Moetteli . |
| 5,364,212 | 11/1994 | Gill . |
| 5,408,905 | 4/1995 | Mikic et al. . |

FOREIGN PATENT DOCUMENTS

| | | |
|---|---|---|
| 0236630 | 9/1987 | (EP) . |
| 1562074 | 4/1969 | (FR) . |
| 2260587 A | 4/1993 | (GB) . |

*Primary Examiner*—D. S. Meislin
(74) *Attorney, Agent, or Firm*—Wenderoth, Lind & Ponack, L.L.P.

(57) ABSTRACT

At least one of two components (1, 3) of a coupling includes a profile with four splines (5) having more or less radial edges (11). Four straight-line segments (6) on the inside of the profile are joined with the splines. The four straight-line segments (6) are designed to circumscribe a standardized square drive (14). This profile can be used for driving sockets and accessories for screwing and unscrewing.

5 Claims, 3 Drawing Sheets

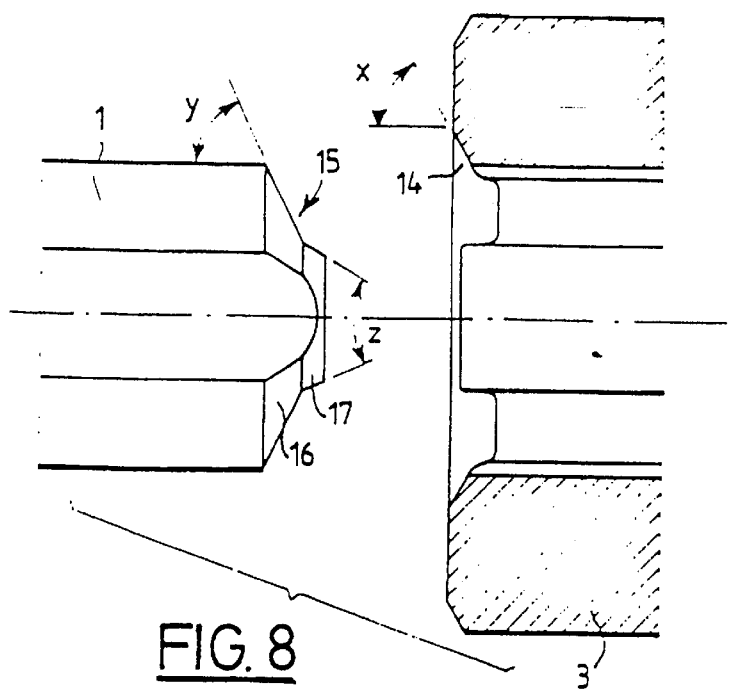
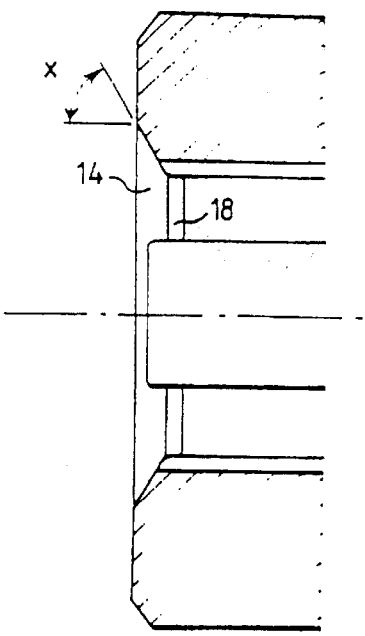
FIG. 8
FIG. 9
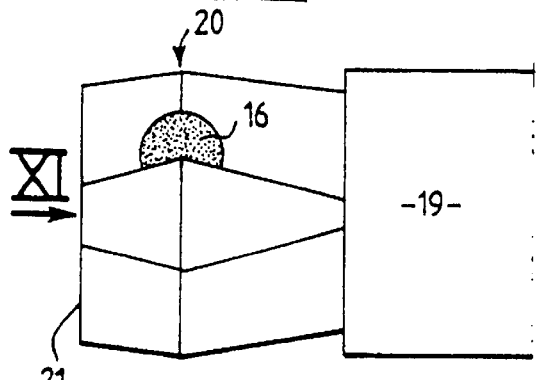
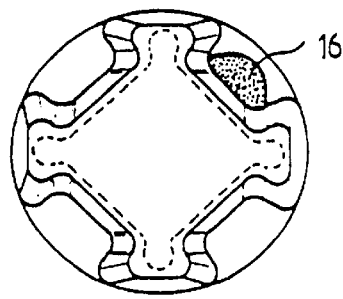
FIG. 10
FIG. 11
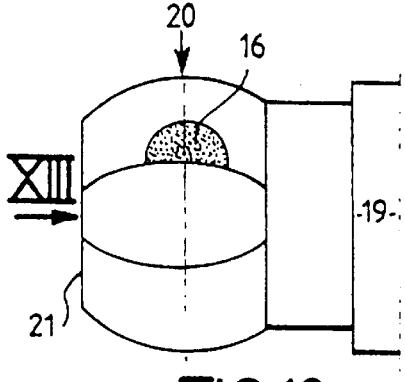
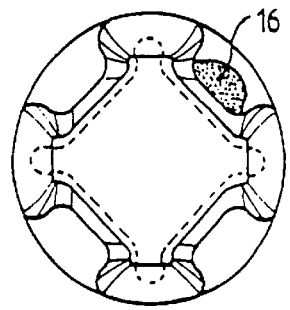
FIG. 12
FIG. 13

SEPARABLE COUPLING AND CORRESPONDING TOOL

This application is a continuation of U.S. application Ser. No. 08/894,063, filed Aug. 12, 1997 which is a 371 of PCT/FR96/00206 filed Feb. 7, 1997.

BACKGROUND OF THE INVENTION (1) Field of the Invention

The present invention relates to a separable coupling between a male component and a female component which is used with to a tool for rotationally driving a screw or a nut.

(2) State of the Prior Art

Current couplings normally use conjugate male square drives and female square drives, defined for example by ISO standard 1174. The male square drive is generally integral with the head of the tool and can fit into the female square of a socket which, at its opposite end, has a driving profile designed for tightening or loosening screws or nuts. This socket may form part of a family of sockets associated with the dimension of the square drive in question. As an alternative, the male square may fit into the female square of other members such as an extension piece, a universal joint, etc.

The standardized dimensions of square drives correspond to sides 6.35 mm (¼), 9.52 mm (⅜), 12.70 mm (½) long, etc. For a given square drive, corresponding to a given tool size, the torque is limited by the mechanical strength of the male square drive This greatly limits the range of sockets that can be used. For a given threaded member, the torque required for loosening is greater than the nominal tightening torque. This amount of torque is largely unpredictable, and this unpredictability can be caused by corrosion.

As a result, if the required torque is greater than the torque capacity of the male square drive, it becomes necessary to change the tool and to use the square drive with the next size up. This assumes that several tools and several boxes of sockets are available, and leads to the use of heavier, bulkier and more expensive tools.

Various proposals have been made for increasing the torque available for a given tool and with a specific hardness of steel. However, this usually involves the use of shapes derived from a hexagon (FR-A-1,560,270 and 2,682,727, U.S. Pat. Nos. 4,512,220, 4,361,412 and 4,930,378, EP-A-0,458,771), which exhibit the drawback of being incompatible with standardized male square drives.

In addition, the known profiles are not generally designed to be equipped satisfactorily with a locking ball acted upon by a spring (as far as the male profile is concerned) or with a recess for accommodating such a ball (in the case of the female profile).

SUMMARY OF THE INVENTION

An object of the invention is to provide a coupling compatible with a standardized male square drive and making it possible, for a given size, to obtain torque which is markedly greater than that corresponding to the square drive, while being able to be equipped effectively with a ball-type locking device compatible with that of this square drive.

To this end, the subject of the invention is a coupling of the aforementioned type, characterized in that at least one of the two components exhibits, in transverse section, a splined profile having four straight-line segments radially on the inside, these straight-line segments together being designed to circumscribe a standardized square drive. At the corners of the square, four splines project radially outwards with respect to the contour of the square drive, the edges of which extend substantially radially. The ends of the straight-line segments are joined to the edges of the splines by rounded portions.

The coupling according to the invention may, also, have a splined profile that is substantially constant over the entire useful height of the corresponding component. Further, the female component may include, in at least one of its flat faces corresponding to the straightline segments, a recess for accommodating a locking member which is acted upon by a spring and which is borne by a flat face of the conjugate male profile or of the standardized square. Another feature is that each rounded portion of the female profile may be joined to the adjacent straight-line segment via a second rounded portion of markedly larger radius which is connected tangentially to the first rounded portion and to the straight-line segment. Further, each rounded portion of the female profile may be joined to the adjacent straight-line segment via a second straight-line segment connected tangentially to the first rounded portion and connected by a ridge to the first straight-line segment, which forms an angle of a few degrees.

The splines may be delimited laterally by edges in the form of straight-line segments or circular arcs orientated substantially radially, which connect tangentially, via rounded linking portions, to the adjacent parts of the profile. The edges of each spline may have an overall direction which is substantially radial with respect to the center of the profile. The splines may also be delimited on the outside by circular arcs belonging to circles whose centers are situated on the overall axes of symmetry of the corresponding splines. Mid-point perpendiculars of the straight-line segments pass through the center of the profile. Each straight-line segment of the female component may include a hollow section near its center, over all or part of its length. Further, the splined profile may be symmetric with respect to the two directions of rotation. Also, the splined profile may be asymmetric with respect to the two directions or rotation.

Another object of the invention is a manual or assisted tool for rotationally driving a screw or a nut. The tool has a first component designed to receive a driving torque and exhibiting a splined profile as defined hereinabove. The tool also has at least one second component for transmitting the driving torque from the first component to the screw or to the nut. This second component exhibits, within the operating clearance, a splined driving profile conjugate with that of the first component.

According to other features of such tool, the female splined profile has a constant section, whereas the male splined profile has a section which increases up to that of the female profile and then decreases, in a bi-linear or bulbous fashion. The female component has a flared entry, whereas the male component has a nose portion whose rear part is substantially frustoconical. The nose portion's front part is substantially in the shape of a cone frustum which is more tapered and is grooved over some of its length by the inter-spline hollows of the male profile. The front part may be designed to fit partially into that part of the female profile, which is delimited by the straight-line segment. Also, the two splined profiles have similar hardnesses, especially on the order of 40 to 50 HRC

BRIEF DESCRIPTION OF THE DRAWINGS

Embodiments of the invention will now be described with respect to the appended drawings, in which:

FIG. 8 represents an arrangement making it easier to insert the male profile inside the female profile;

FIG. 9 shows an alternative of the female profile of FIG. 8;

FIG. 10 is a partial lateral view of an angular extension piece having a male profile according to the invention;

FIG. 11 is an end-on view in the direction of the arrow XI of FIG. 10; and

FIGS. 12 and 13 are views similar respectively to FIGS. 10 and 11, of an alternative.

DESCRIPTION OF THE PREFERRED EMBODIMENTS

Figure 1:
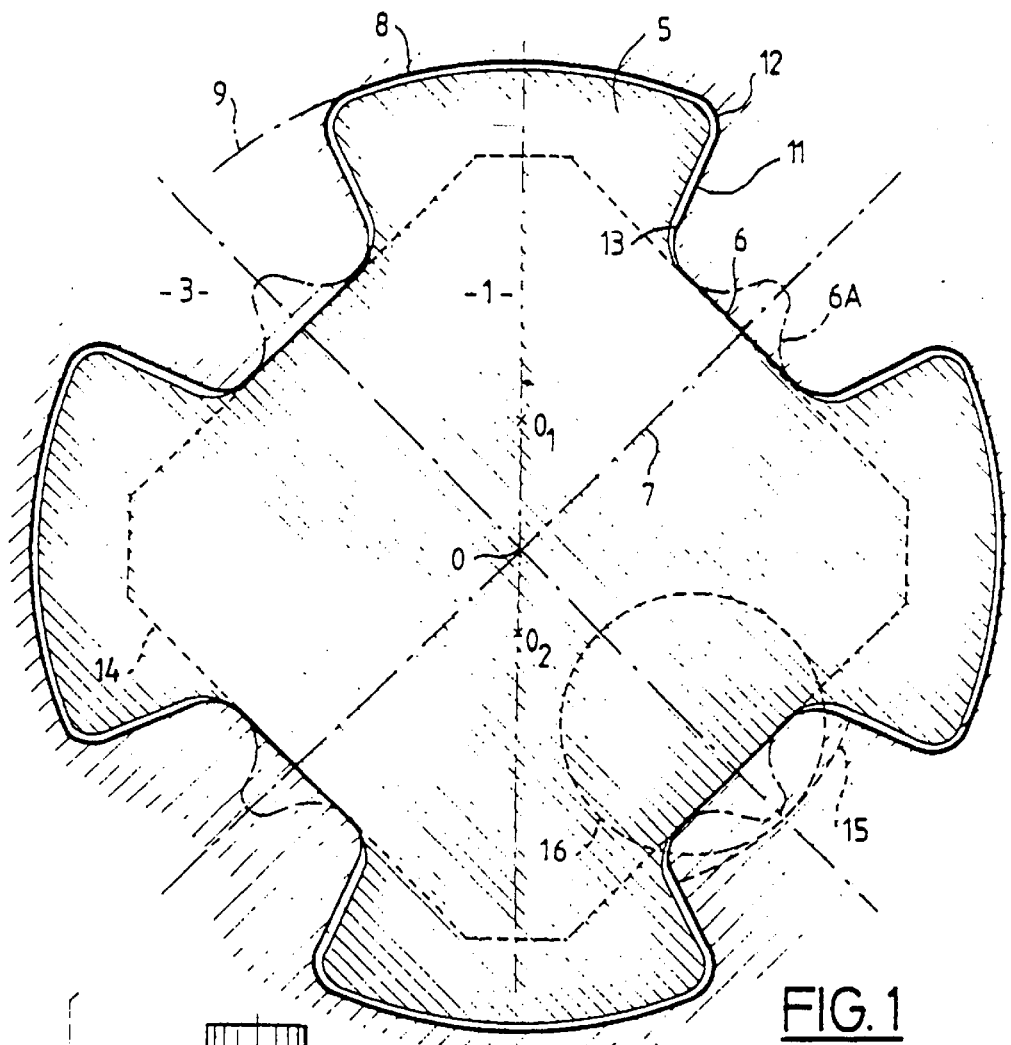
FIG. 1 represents a coupling according to the invention, in transverse section.
Figure 2:
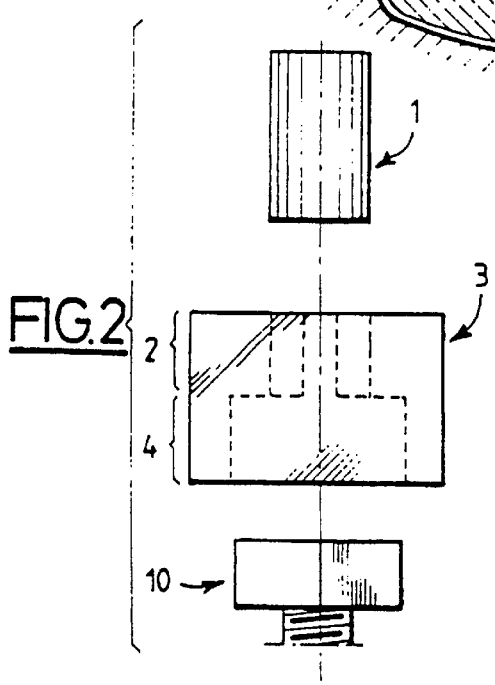
FIG. 2 is a side view of the two components of this coupling and of a screw which they are to act upon.
Figure 3:
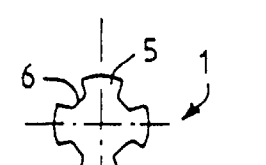
FIG. 3 is an end-on view of a corresponding end piece of a male component.
Figure 4:
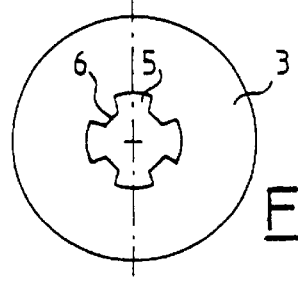
FIG. 4 is an end-on view of a socket of the same coupling.

FIG. 1 represents a profile, in transverse section, of a driving male end piece 1 represented in FIGS. 2 and 3, as well as the conjugate profile, within the operating clearance, of a driving part 2 of a socket 3 represented in FIGS. 2 and 4. A proximal end of the end piece is, when in use, secured to the head of a driving tool. The driving tool has not been represented, and can be for example, a ratchet, an extension piece, or any other accessory. The socket 3 has, opposite from driving part 2, a working part 4 which has any known female profile (hexagonal, "TORX", etc.) intended for engaging with a conjugate threaded member 10 (FIG. 2) to be driven rotationally, such as a screw, a nut, a tap, etc. The profile represented is constant over its entire useful height. The components 1 and 3 have relatively high and relatively similar hardnesses, typically on the order of 40 to 50 HRC.

Each of the male and female profiles have the overall shape of a cross having axial symmetry and include four identical splines 5 situated at 90° from one another with respect to a center 0 of the profile, as well as four intermediate straight-line segments 6. A mid-point perpendicular 7 of each segment 6 passes through the center 0. The splines 5 are defined on the outside by circular arcs 8. The four arcs belong to the same circle 9 centered at center 0, and they are delimited laterally by two straight-line segments 11 oriented more or less radially. As far as the female profile is concerned, concave rounded portions 12 are joined tangentially to the arcs 8 and to segments 11. Convex rounded portions 13 are joined tangentially to these segments 11 as well as to the adjacent segments 6.

The four segments 6 of the female profile are designed to circumscribe, to be within the operating clearances, a standardized male square 14 represented by a broken line. In addition, each of the flat faces of the female profile includes, over the entire length of the segments 6 and at a predetermined height, a recess 15 for accommodating a locking ball 16. The locking ball 16 is acted upon by a spring, and projects from a flat face of the male profile. The vertical position of the recess 15 is designed also to accommodate a locking ball from the standardized male square 14. As an alternative, the ball 16 may be replaced by a spherical-ended plunger (not represented).

If the male profile and the square 14 are compared, it will be observed that the former has a markedly higher polar moment of inertia (or polar strength modulus) with respect to the center 0. This makes it possible to obtain markedly higher torques. In addition, the shape of the splines 5 allows them to withstand such high torques. The substantially radial orientation of the segments 11 results in the torque applied to the tool being transmitted without appreciable loss from the segments 11 of the male profile to those of the female profile.

As an alternative, the extensions of the segments 11 may pass on one or other side of the point 0. The transmission of torque then develops a centrifugal or centripetal force component.

Also as an alternative, the circular arcs 8 may be centered on other points on the axis of symmetry of the corresponding splines, situated nearer (point 01) or farther (point 02) than the point 0.

Also as an alternative, as indicated by a dashed line in FIG. 1, a central part of each segment 6 of the female profile may be a hollow portion 6A. This hollow portion 6A may be applied to practically the entire length of the segment 6. However, if a ball-type lock is used, it must lie within the recess 15, as illustrated.

Figure 5:
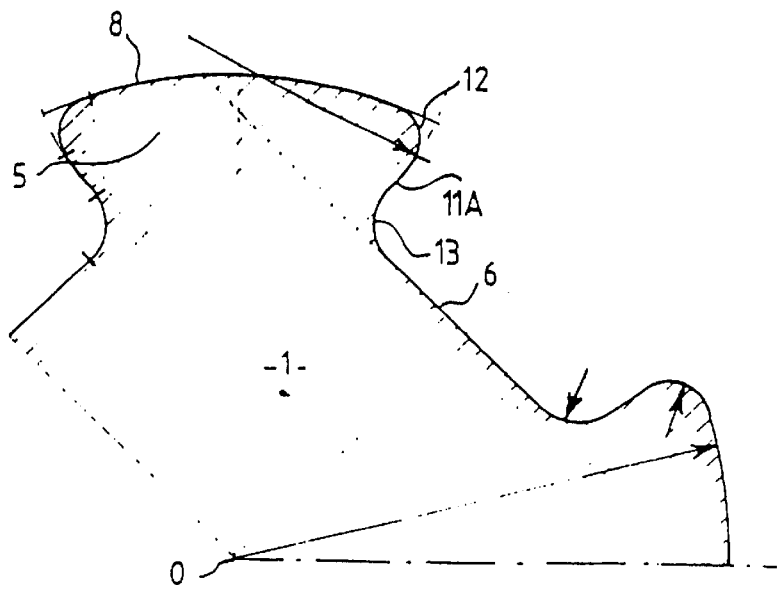
FIG. 5 is a view of an alternative of a male profile.
Figure 6:
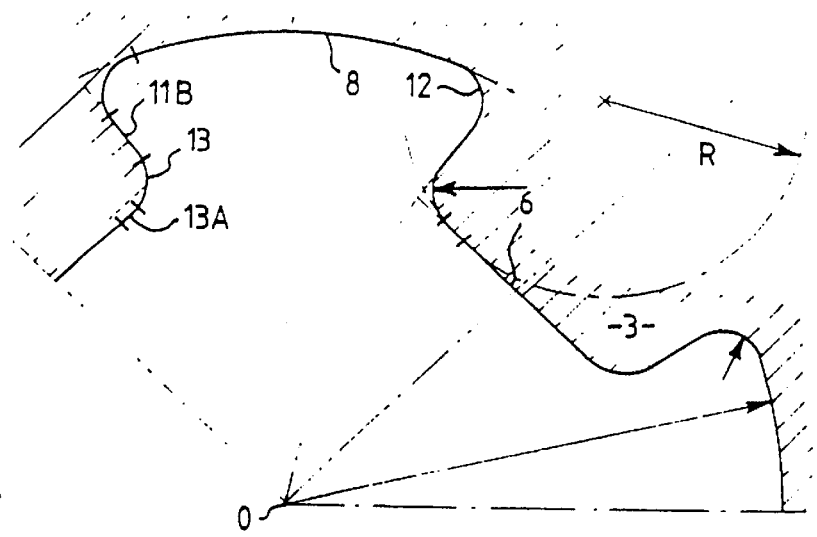
FIG. 6 is a partial view of an associated alternative of a female profile.

In the alternative of FIGS. 5 and 6, the male profile (FIG. 5) is modified by the fact that the straight-line segments 11 are replaced by convex circular arcs 11A. As far as the female profile is concerned (FIG. 6); it is modified in two ways. On the one hand, its straight-line segments 11 are replaced by convex circular arcs 11B, having a radius greater than that of the circular arcs 11A. In addition, one convex circular arc 13A of large radius R is interposed between each end of each straight-line segment 6 and the adjacent rounded portion 13 and connects tangentially to these.

The effect of these modifications is to position the points of contact between the two profiles, when torque is applied, close to the outer ends of splines, which increases the transmitted torque. On the other hand, it improves the transmission of torque from the standardized square 14 to the female profile, as explained in FR-A-2,560,099.

Figure 7:
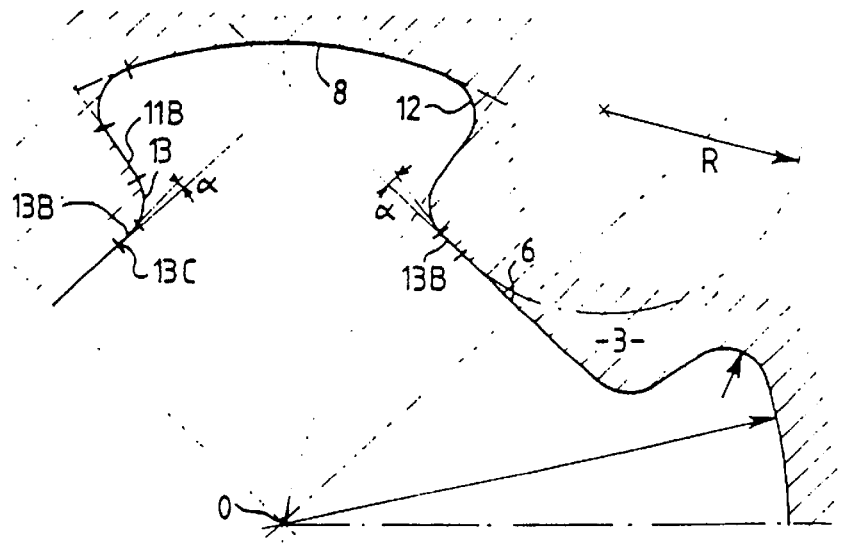
FIG. 7 is a partial view of another alternative of the female profile.

An alternative, FIG. 7, differs from FIG. 6 merely in that the arcs 13A are replaced by short straight-line segments 13B joined tangentially to the rounded portions 13 and forming an angle α of a few degrees with the segments 6, to which they are connected by ridges 13C. This alternative again improves the transmission of torque from the standardized male square 14 to the female profile.

Also as an alternative, the splines 5 and/or the segments 6 may be asymmetric with respect to two directions of rotation, for example combining two of the alternatives described hereinabove.

FIG. 8 represents the adjacent ends of two components respectively including a male profile and a female profile which are conjugate in accordance with the invention. It is possible in particular for these two components to be the male end piece 1 and the socket 3 of FIG. 2.

The proximal end of the socket has a chamfer 22, and an angle x which is, for example, 60 degrees with respect to the axis of the socket.

As far as the end piece 1 is concerned, it includes at its distal end a nose 23 consisting of two successive cone frustums: a proximal cone frustum 24 with an angle y on the order of 70° with respect to the axis of the end piece, and an end cone frustum 17 which is more tapered subtending an angle z on the order on 90°.

The distance between flat sides of the corresponding standardized square, that is to say the distance separating two opposed segments 6 in FIG. 1, is between the smallest diameter and the largest diameter of the cone frustum 17. As a consequence, the four recesses of the profile bite into the cone frustum 17, almost as far as mid-way along it.

This arrangement makes it possible to guide the insertion of the male component into the female component in a way which is especially convenient for the user.

As an alternative (FIG. 9), the chamfer 22 may be shortened from the proximal end portion of the socket 3, and may follow a second chamfer 18 subtending a smaller angle.

FIGS. 10 and 11 illustrate the application of the invention to an extension piece known as an "angular extension". After the angular extension has been inserted into the female element and locked axially by the ball or the locking plunger acted upon by a spring, it allows a certain angular deflection about the diameter passing through the central axis of this locking member.

Thus, a distal end of the extension piece, projecting out of its handle 19, includes a male profile as previously defined, the dimensions of which increase progressively and homothetically from the handle 19 to a section 20 of maximum cross-sectional area corresponding to that of the female element. Then it decreases progressively as far as a distal end portion 21 of the extension piece.

In the example of FIGS. 10 and 11, the increase and decrease in dimensions take place linearly. In contrast, in the example of FIGS. 12 and 13, they take place in a domed manner, giving the end of the extension piece the overall shape of a truncated ball.

Also represented diagrammatically in FIGS. 10 to 13 is the visible part of a locking ball 16 borne by the male profile between two of its splines.

While preferred embodiments of the present invention are shown and described, the invention is not intended to be limited by the foregoing disclosure.

What is claimed:

1. A torque transfer component comprising a female driving portion having a useful height and a transverse cross-section profile, the profile comprising:

four inner wall segments disposed on a square which circumscribes a square drive;

four splines projecting radially outward from respective corner regions of said square, each of said splines being respectively delimited by two lateral edges and an outer edge;

first rounded portions joined to respective said lateral edges wherein said first rounded portions circumscribe first arcs defined by a first radius;

second rounded portions tangentially joining respective first rounded portions to said inner wall segments wherein said second rounded portions circumscribe second arcs defined by a second radius which is greater than said first radius; and wherein said profile is constant over the entire useful height of the female driving portion.

2. The torque transfer component according to claim 1, wherein the square drive has a dimension selected from the group consisting of 6.35 mm, 9.53 mm, 12.70mm, 15.88mm, 19.05 mm, 25.40mm, 38.10 mm, and 63.50 mm.

3. A torque transfer component comprising a female driving portion having a useful height and a transverse cross-section profile, the profile comprising:

four inner wall segments disposed on a square which circumscribes a square drive;

four splines projecting radially outward from respective corner regions of said square, each of said splines being respectively delimited by two lateral edges and an outer edge;

rounded portions joined to respective said lateral edges;

straight-line wall segments joining at an angle respective said rounded portions to respective said inner wall segments by a ridge; and wherein said profile is constant over the entire useful height of the female driving portion.

4. The torque transfer component according to claim 3, wherein the square drive has a dimension selected from the group consisting of 6.35 mm, 9.53 mm, 12.70 mm, 15.88 mm, 19.05 mm, 25.40 mm, 38.10 mm, and 63.50 mm.

5. A tool, comprising:

a female torque transfer component including a female driving portion with a flared entry and having a useful height, said female driving portion defining a cavity profile in a transverse cross-section, said cavity profile including four inner wall segments disposed on a square which corresponds to a square drive, four splines projecting radially outward from respective corner regions of said square, each of said splines being respectively delimited by two lateral edges and an outer edge, rounded portions which join respective said lateral edges to said inner wall segments, and wherein said profile is constant over the entire useful height of said female driving portion; and a male torque transfer component adapted to be co-axially mated with said female torque transfer component, said male torque transfer component including a male driving portion which exhibits in at least one transverse cross-section thereof, to within an operating clearance, a male profile adapted to be conjugated with said cavity profile of said female torque transfer componet, and a nose comprising a proximal cone frustum and an end cone frustum, said end cone frustum forming a smaller angle with an axis of said male driving component than said proximal cone frustum.

\* \* \* \* \*